(12) United States Patent
Kaiser

(10) Patent No.: US 6,588,336 B2
(45) Date of Patent: Jul. 8, 2003

(54) METHOD AND SYSTEM FOR PRODUCING SCREEN DATA USING A SEPARATE RIP FOR EACH COLOR

(75) Inventor: Michael Kaiser, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 302 days.

(21) Appl. No.: 09/761,812

(22) Filed: Jan. 16, 2001

(65) Prior Publication Data

US 2001/0008106 A1 Jul. 19, 2001

(30) Foreign Application Priority Data

Jan. 14, 2000 (DE) .......................... 100 01 211

(51) Int. Cl.[7] .............. B41F 17/10; B41F 5/16; B41L 39/00
(52) U.S. Cl. ................. 101/171; 101/181; 101/484
(58) Field of Search .................. 101/171, 181, 101/484; 358/1.9, 1.18, 1.13

(56) References Cited

U.S. PATENT DOCUMENTS

| | | | | |
|---|---|---|---|---|
| 5,136,316 A | * | 8/1992 | Punater et al. ............ | 347/154 |
| 5,687,300 A | * | 11/1997 | Cooper ...................... | 358/1.9 |
| 5,806,430 A | * | 9/1998 | Rodi ........................... | 101/484 |
| 6,252,676 B1 | * | 6/2001 | Azima et al. ................ | 358/1.9 |
| 6,256,108 B1 | * | 7/2001 | Dziesietnik et al. ....... | 358/1.18 |
| 6,411,396 B1 | * | 6/2002 | Benson et al. ............. | 358/1.18 |
| 2002/0063877 A1 | * | 5/2002 | Lucivero et al. ........... | 358/1.13 |

OTHER PUBLICATIONS

"Das Ende vom Anfang" (The beginning of the end), Dominik Allartz, Druck & Medien–Magazin Jan. 2000, pp. 46–51.

* cited by examiner

*Primary Examiner*—Charles H. Nolan, Jr.
(74) *Attorney, Agent, or Firm*—Laurence A. Greenberg; Werner H. Stemer; Gregory L. Mayback

(57) ABSTRACT

A method of producing screen data for imaging units of a printing machine includes the steps of breaking down raw image data into a plurality of partial images, respectively, corresponding to one printing ink; outputting the partial images to a plurality of screen processors, respectively, corresponding to the number of colors to the printed; and processing the partial images simultaneously for forming screen data by the screen processors for output to a respective one of the imaging units; and a system for performing the method.

8 Claims, 1 Drawing Sheet

METHOD AND SYSTEM FOR PRODUCING SCREEN DATA USING A SEPARATE RIP FOR EACH COLOR

BACKGROUND OF THE INVENTION

Field of the Invention

The invention relates to a method and system for producing screen or raster data for imaging units of a printing machine.

Printing machines with imaging units have become known heretofore. Imaging units of this type produce a printing image on a printing plate of the printing machine by scanning with a laser beam, the position and size of the screen or raster dots of the printing image being controlled by screen or raster data, with which the laser beam is modulated in the course of a scanning movement over the surface of the printing plate.

With the aid of imaging units of this type, as compared with the conventional film exposure technique, a plurality of processing stages on the path from an original image to the finished print are dispensed with, so that alternating print jobs can be processed speedily and cost-effectively. Nevertheless, even when such imaging units are used, the processing process from the original image to the finished print breaks down into a multiplicity of processing stages which have to be performed successively and which, to some extent, are time-consuming. In a conventional screen production system, as illustrated in FIG. 1 of the drawings herein, raw image data initially passes through a screen processor 1 (screen image processor RIP), which converts this data into a plurality of partial images, respectively, one partial image for each color to be printed, while simultaneously performing all of the necessary calibration operations. These partial images, respectively, are transferred by an administration unit 2 into a buffer storage unit 3. After the screen processor 1 has completely processed the original image, and all the necessary partial images are present in the buffer storage unit 3, they can be transferred therefrom to the imaging units 4 of a diagrammatically illustrated printing machine 5. Buffering the screen data in the unit 3 is necessary, because the imaging units 4, respectively, must be supplied with data without interruption at a data rate which is predefined or prescribed by the type of construction thereof, and a non-buffered imaging process will fail if the screen processor 1 is not capable of supplying the data at the required rate.

Consequently, the imaging units 4 remain inactive while the screen processor 1 is operating, and the reverse. Because the screen data for each screen dot to be produced by the imaging units must specify the size of the respective dot, they include a significantly greater quantity of data than the raw data originally input into the screen processor 1, which, for example, can be a file in Postscript or PDF format. Storing the screen data for the situation wherein they are used again for a subsequent print job is therefore rather complicated. In addition, if the screen processor 1 performs a high-quality calibration, the dot increases or growths of the individual imaging units of the various stages of the printing machine are taken into account in the specification of the screen dots. These dot increases or growths can vary from one imaging unit 4 to another, within certain limits, because of the scatter in the optical properties of the laser and the scanning system, which are used. Consequently, the screen processor 1 produces the screen data for a given printing ink, respectively, taking specifically into account the properties of the imaging unit 4 which sets the image on the printing plate for the relevant color. If a print job is to be repeated based upon stored screen data, it is consequently necessary for the distribution of the printing inks to the various stages of the printing machine 5, at the time the print job is repeated, to be the same as that for which the screen data were originally calculated. If, in the interim, jobs with a different sequence of colors have been processed, this would require lengthy washing and re-inking of the printing machine.

For a repetition of the print job on a different machine, renewed screening calibrated to the imaging units of the machine is always necessary, even if the machines are of identical construction and are equivalent in all the other relevant parameters, such as the printing material, the color used, the plate material, and so forth.

SUMMARY OF THE INVENTION

It is accordingly an object of the invention to provide a method and system for producing screen data for imaging units of a printing machine, which permit further acceleration of operating steps from the original raw image to the print.

With the foregoing and other objects in view, there is provided, in accordance with one aspect of the invention, a method of producing screen data for imaging units of a printing machine, which comprises the steps of breaking down raw image data into a plurality of partial images, respectively, corresponding to one printing ink; outputting the partial images to a plurality of screen processors, respectively, corresponding to the number of colors to the printed; and processing the partial images simultaneously for forming screen data by the screen processors for output to a respective one of the imaging units.

In accordance with another mode, the method of the invention includes performing by the screen processors, respectively, a calibration of the partial images relative to dot growth of the imaging unit with which it is associated.

In accordance with a further mode, the method of the invention includes breaking down the raw image data in a preprocessing unit that is separate from the screen processors.

In accordance with an added mode, the method of the invention includes performing a calibration by the preprocessing unit, relative to properties of at least one of the printing material, the printing ink, the blanket cylinder, and the plate material of the printing machine.

In accordance with an additional mode, the method of the invention includes, by the preprocessing unit, outputting partial image data to the screen processors before the step of breaking down the raw image data has been finished.

In accordance with yet another mode, the method of the invention includes buffering the screen data before outputting the screen data to the respective imaging units.

In accordance with yet a further mode of the method invention, the step of breaking down raw image data includes a trapping procedure.

In accordance with a concomitant aspect of the invention, there is provided a screen production system for a printing machine having imaging units, comprising a preprocessing unit for receiving raw image data and for breaking down the raw image data into a plurality of partial images, respectively, corresponding to one printing ink, and a plurality of screen processors, respectively, for screening the partial images, respectively, and for outputting to the imaging units, respectively, partial-image screen data obtained from the respective partial images.

Thus, instead of determining, in order, the sizes of the screen dots of the colors to be printed for each point or dot in an image to be printed here, initially, a separation into various colors is performed, and the partial image data, respectively, corresponding to one color, is processed by a screen processor which is specifically provided for the purpose and which is therefore capable of providing the screen data of the associated color significantly more rapidly than heretofore.

The calibration of the partial images relative to the dot growth of the imaging unit, the calibration being necessary for a high-quality print, is preferably performed by the screen processor which is associated with the imaging unit. Those partial images not yet screened, which form data files of a relatively small size, can comfortably be stored intermediately for a repetition of the print job. When the print job is to be repeated, the intermediately stored partial images are screened anew. If, in the interim, the distribution of the colors to the stages of the printing machine has changed, or another printing machine is to be used, the renewed screening can be performed by a screen processor that differs from the first one and can be calibrated to the dot growth of a different printing stage.

The step of breaking down the raw image data into partial images is preferably performed in a preprocessing unit that is separate from the screen processors. This preprocessing unit can perform a calibration relative to all those printing parameters which are standard for the various stages of the printing machine, thus, for example, the printing material used, the printing ink, the blanket cylinder or the plate material of the printing machine.

A particular advantage in using the preprocessing unit is the possibility of intermeshing in time the actions of breaking down and screening, by the preprocessing unit outputting partial image data to the screen processors before the step of breaking down the raw image data has been finished completely.

In order to be able to ensure a uniform data stream at the rate required by the imaging unit, the screen data are preferably buffered before being output to the imaging unit. However, such a buffer can be considerably smaller than that needed to store an entire partial image. If the computing power of the screen processors is sufficiently high so that they can ensure a stream of screen data at the rate required by the imaging unit, the buffer can even be omitted completely.

The step of breaking down the raw image data preferably also includes a trapping procedure.

The object of the invention is also achieved by a screen production system for a printing machine which includes a preprocessing unit for receiving raw image data and for breaking down the raw image data into a plurality of partial images, each of which corresponds to one printing ink, and a plurality of screen processors for screening one of the partial images, respectively, and for outputting the thus obtained partial-image screen data to an imaging unit.

Other features which are considered as characteristic for the invention are set forth in the appended claims.

Although the invention is illustrated and described herein as a method and embodied as a system for producing screen data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 2:
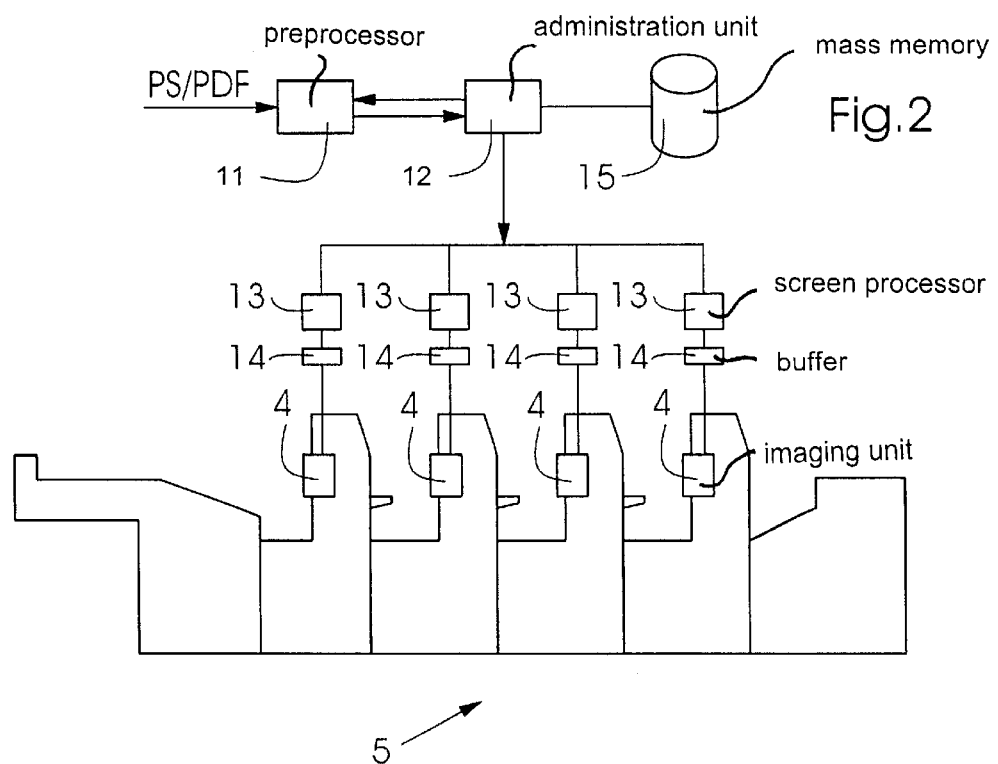
FIG. 2 is a block diagram of a screen production system according to the invention of the instant application and a printing machine connected thereto, for performing the method according to the invention.

Referring now to FIG. 2 of the drawings, there is shown therein the screen production system of the invention, including a preprocessor 11, which is set up for processing raw image data in a present-day or current electronic format, such as a Postscript or PDF format. These data contain, for example, lists of objects with defined shape, which are described by diverse parameters such as size, position in the image, color values, and so forth. The preprocessing unit 11 converts these raw image data into "two-dimensional lists", which, for each dot in the image to be printed, specify the tonal value of the various printing inks. These printing inks generally have the colors black, cyan, magenta and yellow. In this case, four lists will be produced; however, so-called spot or decorative colors can also be specified in the raw image data, for which, respectively, a dedicated list is produced, a dedicated stage, respectively, in the printing machine being required for printing the spot colors.

This preprocessing includes, amongst others, a trapping step. In this step, edges of colored areas, which are produced by overprinting several colors, are determined, and the size of the color area of a color which is to be printed with a low density is slightly reduced, in order to prevent a situation wherein a light edge of this color projects beyond the edge of the relevant color area, whenever an exact alignment of the colors relative to one another in the printing machine is incomplete.

Together with an administration unit 12, a preprocessor 11 forms a preprocessing unit. The administration unit 12 supplies the preprocessor 11 with information about the colors to be used in the print, the printing material, printing-plate material, blanket cylinder, and so forth, relating to all those parameters in the printing process which can have an influence on the color reproduction, but are not, respectively, specific to one stage of the printing machine that is used. The preprocessor 11 can include these diverse parameters directly in the calculation of the lists and even transfer appropriately fully-calibrated lists to the administration unit 12. A different, preferred option is for the preprocessor 11 to be restricted to using the transmitted parameters to produce a calibration data set, somewhat in the form of a single standardized calibration curve, wherein the influences of the diverse relevant parameters are combined, and to transfer this calibration data set, together with non-calibrated lists, to the administration unit 12. The latter can then begin to correct initially transferred parts of the lists with the aid of the calibration data sets, even before the preprocessing unit 11 has broken down the raw image data completely into partial images.

Separate handling of lists and calibration data sets also gives the pressman the option of editing the calibration data sets, for example, at a computer terminal, and performing manual corrections therein, in order to optimize the printed result or to introduce specific effects.

The administration unit 12 forwards the lists "precalibrated" in accordance with the calibration data sets to a respective one of a plurality of screen processors 13 which, respectively, are permanently associated with an imaging unit 4 of the printing machine 5. In this regard, the administration unit 12 registers the color with which each individual stage of the printing machine 5 is charged, and forwards the list for the relevant color to the appropriate screen processor 13. The latter performs a second calibration of the received data for the dot growth of the imaging unit 4 connected thereto and transmits the screen data via a buffer 14 to the appropriate imaging unit 4. The dot-growth calibration therefore always proceeds correctly, without requiring the administration unit 12 to know the dot growth properties of the imaging unit which, at a given instant of time, is charged with a given color. The total size of the buffer storage 14 can be significantly smaller than that of the conventional buffer storage 13, because the buffer storages 14 are no longer used to store complete partial images but at most to adapt or match the processing rate of the screen processors to the data rate required by the imaging units 4.

Figure 1:
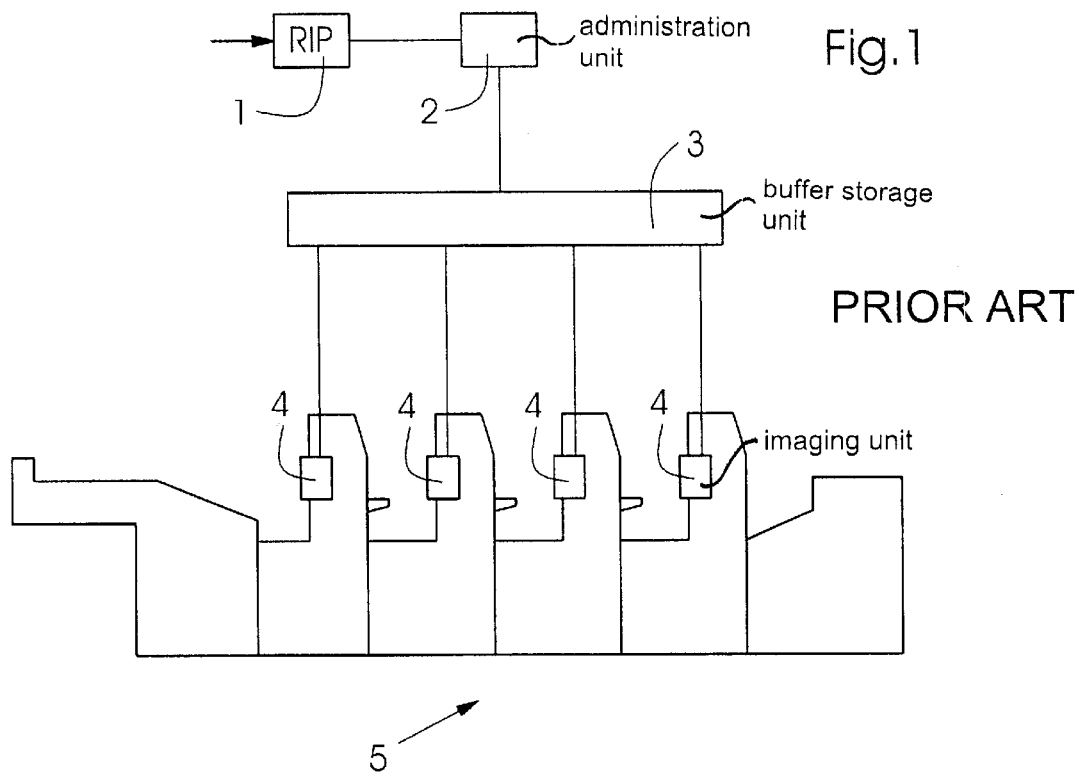
FIG. 1, which was aforementioned herein, is a block diagram of a screen production system according to the prior art, that is connected to a printing machine.

In comparison with the conventional system of FIG. 1, the result in the system according to the invention illustrated in FIG. 2 is a manifold saving in processing time. Of the many processing stages which the raw image data pass through in the inventive system of FIG. 2, only the first, the production of the lists in the preprocessor 11, has to be finished before the further processing steps can begin. This is necessary because the sequence of the occurrence of image elements in the raw image data in the Postscript format does not have to coincide with the location at which the relevant element is located in the image. As long as the raw image data have not been processed completely by the preprocessor 11, there is no knowledge to the effect that a value in the list to be transferred to the administration unit 12 does not yet need to be changed. The instant that the lists are available, they can be output by the preprocessor 11, it being necessary, of course, for the output sequence of the list to correspond to the sequence of imaging or image-setting of the dots in the imaging units. The output of the lists to the administration unit can be nested in time, so that the output for all of the lists begins and ends approximately simultaneously. The precalibration performed by the administration unit 12 follows the sequence of the data predefined by the preprocessor. Accordingly, the administration unit 12 begins to supply all the screen processors 13 with partial image data approximately simultaneously. These data can therefore begin with the dot-growth calibration and screening even before the output of the lists by the preprocessor 11 has been completely finished.

If the processing speed of the screen processors 13 is sufficiently high so that they can make screen data available at the rate needed by the imaging units, it is possible for the screen processors 13, even shortly after the arrival of the first partial image data, to begin to supply the imaging units with data. If the processing speed of the screen processors 13 is lower, initially, part of the image data is intermediately stored in the buffers 14, and the output to the imaging units is delayed for some time. The duration of the delay time can be selected so that, in any case, before the screening has been completed, a start is made on the output to the imaging units. By a clever choice of the starting time, it is possible to achieve a situation wherein, at the instant of time at which the screen processors complete the screening, the buffer has virtually been emptied again, and the output of the data to the imaging units ends with only an insignificant delay after the end of the screening. By this multiple time-intermeshing of the processing, the processing time from the original image to the finished, image-set or exposed plate from the imaging unit may be shortened considerably.

It may therefore be economical to store data from images which have to be preserved for repeated printing, for example in the form of lists, in conjunction with a calibration data set or in previously precalibrated form, in a mass memory 15. When these images are to be printed again, the administration unit allocates the lists to various stages in the printing machine again in accordance with the color thereof, it being possible, in the event of a repetition of a printing operation, for the allocation to be readily made to a different stage in the printing machine than that during the first printing. This may be necessary if the distribution of the printing inks to the various stages of the printing machine has been changed between the two printing operations. Because the dot-growth calibration for the repeated print can be performed anew and specifically for the respective imaging unit, the same quality level can be achieved in the repeated print as in the first print, even when, in the interim, the distribution of the printing inks to the stages has been changed.

I claim:

1. A method of producing screen data for imaging units of a printing machine, which comprises the steps of breaking down raw image data into a plurality of partial images, respectively, corresponding to one printing ink; outputting the partial images to a plurality of screen processors, respectively, corresponding to the number of colors to be printed; and processing the partial images simultaneously for forming screen data by the screen processors for output to a respective one of the imaging units.

2. The method according to claim 1, which includes performing by the screen processors, respectively, a calibration of the partial images relative to dot growth of the imaging unit with which it is associated.

3. The method according to claim 1, which includes breaking down the raw image data in a preprocessing unit that is separate from the screen processors.

4. The method according to claim 3, which includes performing a calibration by the preprocessing unit, relative to properties of at least one of the printing material, the printing ink, the blanket cylinder, and the plate material of the printing machine.

5. The method according to claim 4, which includes, by the preprocessing unit, outputting partial image data to the screen processors before the step of breaking down the raw image data has been finished.

6. The method according to claim 1, which includes buffering the screen data before outputting the screen data to the respective imaging units.

7. The method according to claim 1, wherein the step of breaking down raw image data includes a trapping procedure.

8. A screen production system for a printing machine having imaging units, comprising a preprocessing unit for receiving raw image data and for breaking down the raw image data into a plurality of partial images, respectively, corresponding to one printing ink, and a plurality of screen processors, respectively, for screening the partial images, respectively, and for outputting to the imaging units, respectively, partial-image screen data obtained from the respective partial images.

* * * * *